J. C. McINTYRE.
CLEANER AND SCALDER.
APPLICATION FILED DEC. 11, 1914.
1,222,008.
Patented Apr. 10, 1917.
4 SHEETS—SHEET 1.
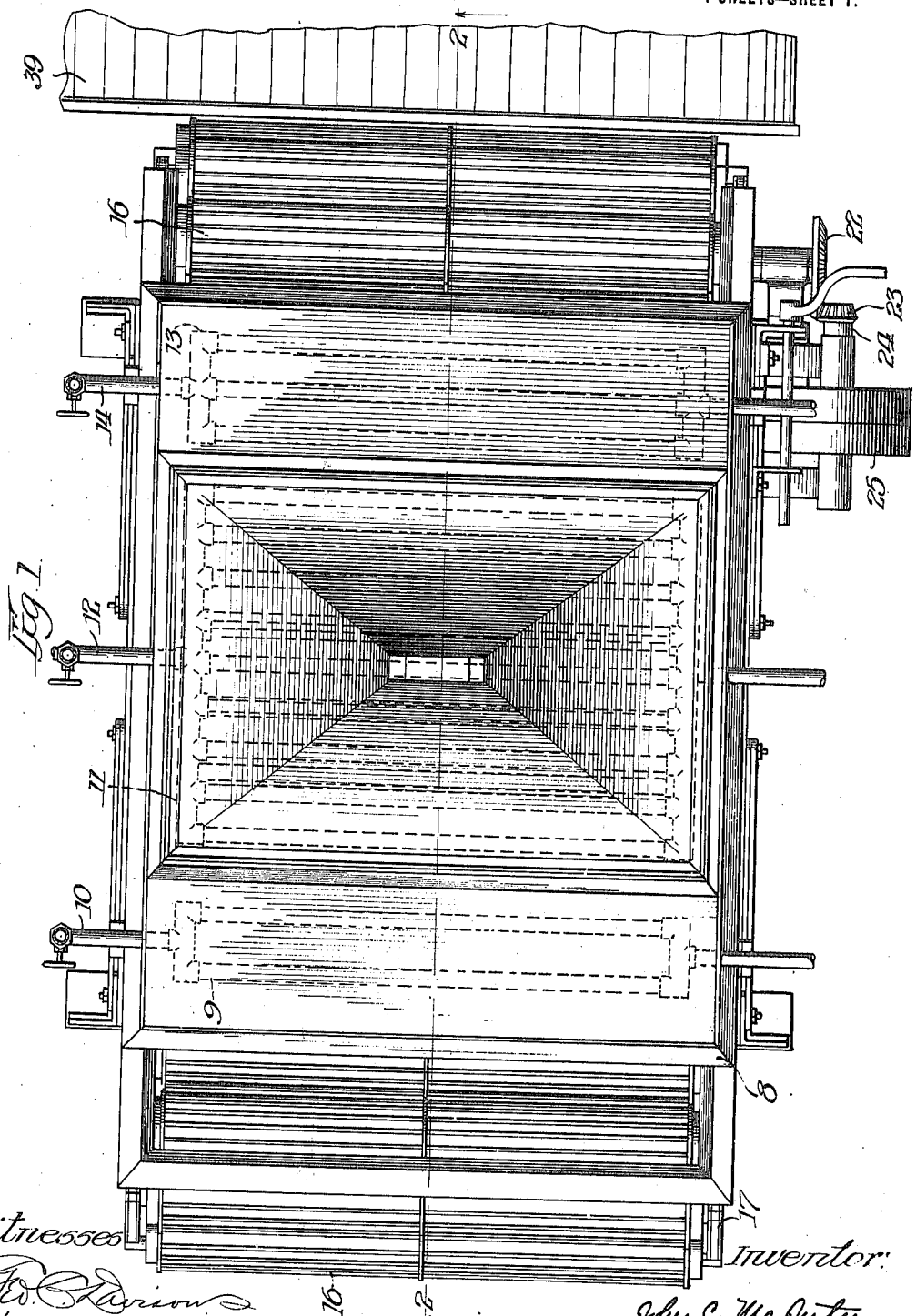

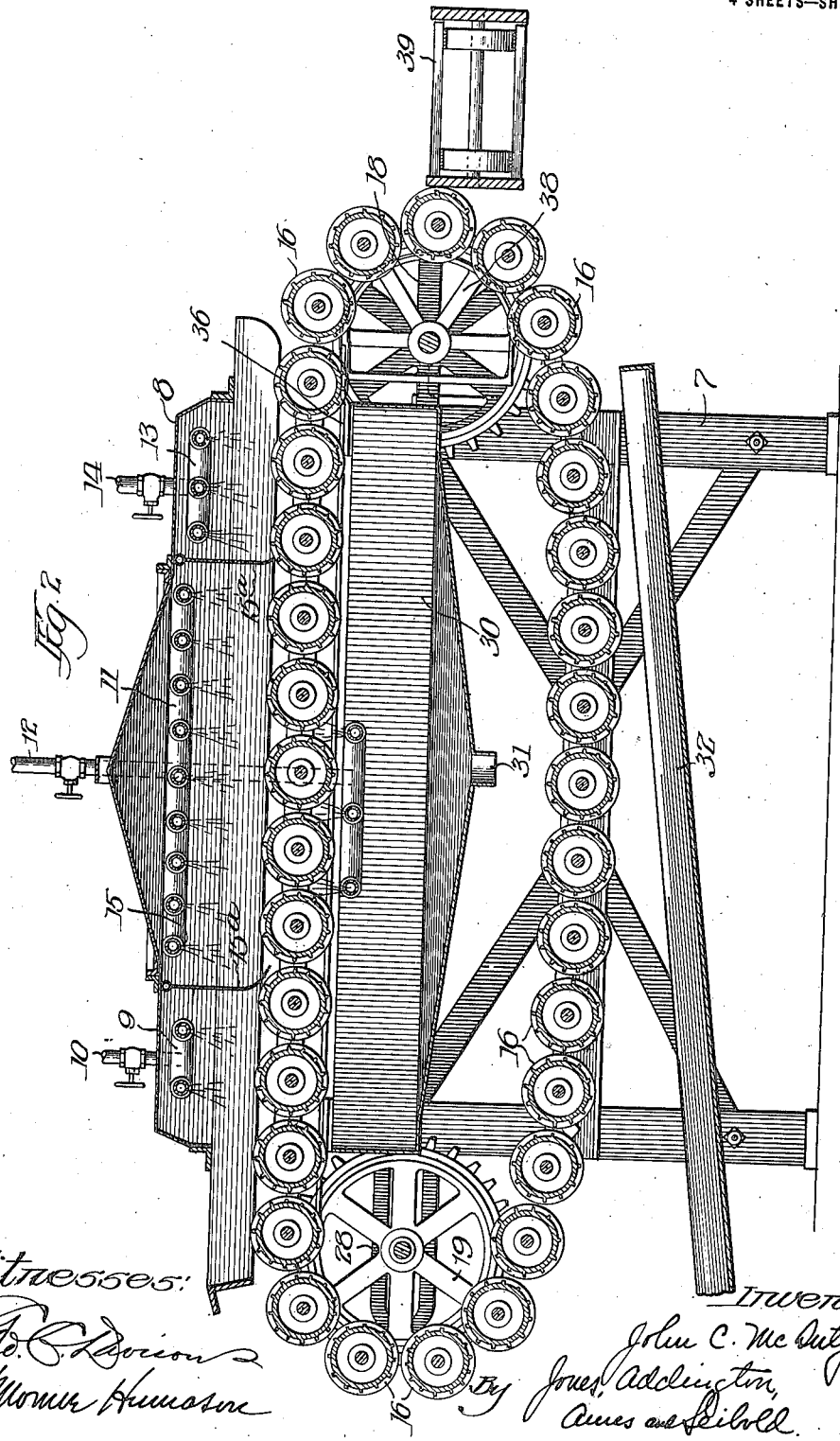

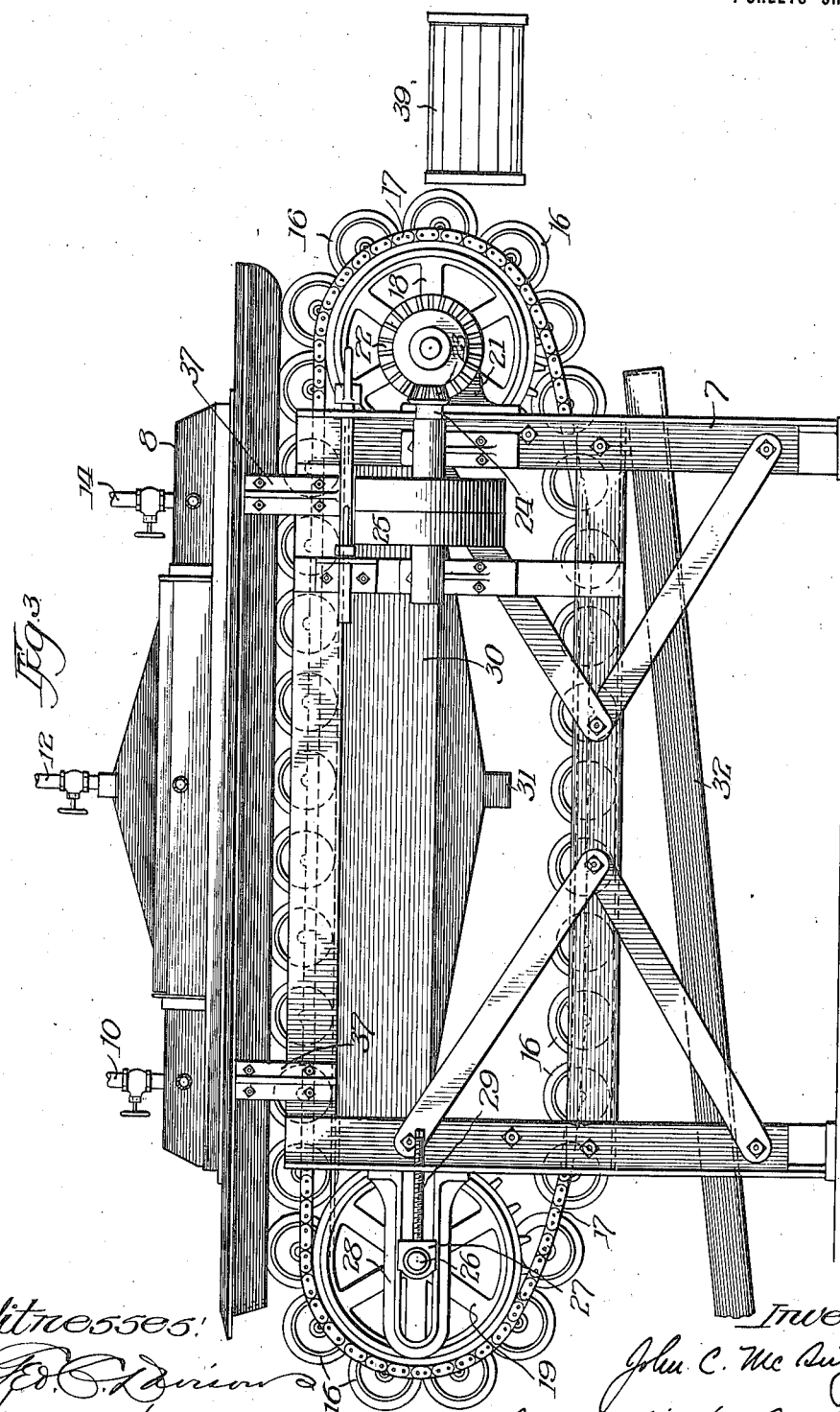

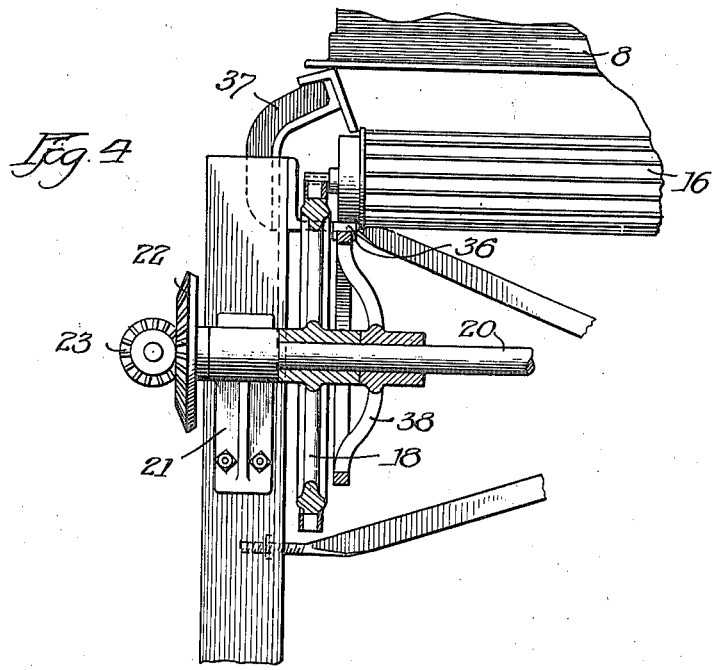
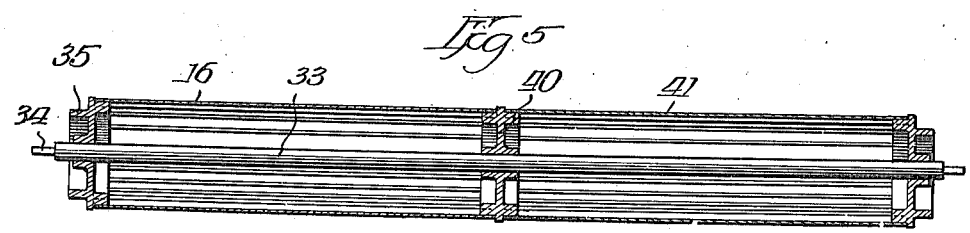
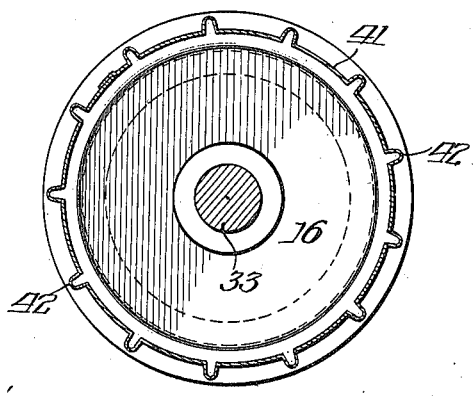

UNITED STATES PATENT OFFICE.

JOHN C. McINTYRE, OF HOOPESTON, ILLINOIS, ASSIGNOR TO SPRAGUE CANNING MACHINERY COMPANY, OF CHICAGO, ILLINOIS, A CORPORATION OF ILLINOIS.

CLEANER AND SCALDER.

1,222,008.

Specification of Letters Patent.  Patented Apr. 10, 1917.

Application filed December 11, 1914. Serial No. 876,648.

*To all whom it may concern:*

Be it known that I, JOHN C. McINTYRE, a citizen of the United States, residing at Hoopeston, in the county of Vermilion and State of Illinois, have invented new and useful Improvements in Cleaners and Scalders, of which the following is a full, clear, concise, and exact description, reference being had to the accompanying drawing, forming a part of this specification.

My invention relates to improvements in cleaners and scalders for fruits and vegetables and particularly to that class of cleaners and scalders in which steam and water are discharged upon the fruit or vegetable to insure more thorough treatment than is obtainable by a mere submersion in a washing or scalding medium.

Certain fruits and vegetables have one portion of their surface more inclined to collect dirt and so more difficult to clean than other portions. For example, in the case of tomatoes, the surface is substantially smooth and rounded except adjacent the stem. There is found a depression where dirt, molds and bacteria collect. Furthermore, the skin of tomatoes is firmly attached to the spot at the bud end directly opposite the stem end and in order to facilitate peeling it is important that thorough treatment by the scalding medium be directed to this spot as well. In scalders and cleaners as heretofore known it has been found that the fruit or vegetables will be subjected to the cleaning and scalding media in a variety of positions with the result that the most effective cleaning and scalding process is not always directed toward the portions most needing it, as there is lacking thorough and uniform treatment of the fruit or vegetable at the stem and bud ends.

It is one of the objects of my invention to provide means for subjecting fruit or vegetables to cleaning and scalding sprays such that all portions of such fruit or vegetables, and particularly the portions around the stem and bud ends, will be presented to the sprays in a uniform manner during the greater portion of their travel through the sprays.

It is a further object of my invention to provide means for obtaining a uniform attrition action on the surface of the fruit or vegetable by the carrying mechanism.

Additional objects and advantages of my invention will be apparent from the following description taken in connection with the appended claims.

I have described in the following specification and illustrated in the accompanying drawings a cleaner and scalder constructed in accordance with my invention, it being understood that numerous changes may be made in the form, construction and arrangement of the parts without departing from the spirit of my invention or exceeding the scope of the appended claims, the form of the invention herein disclosed being merely one preferred embodiment thereof.

In the drawings:

Figure 1 is a plan view of a cleaner and scalder constructed in accordnace with my invention;

Fig. 2 is a cross sectional view of the same taken on the line 2—2 of Fig. 1, looking in the direction of the arrows;

Fig. 3 is a view of the same in side elevation;

Fig. 4 is a view in end elevation showing a portion of Fig. 3;

Fig. 5 is a detail showing in horizontal cross section one of the rollers; and

Fig. 6 is a detail showing a transverse section of the same (enlarged).

Referring to the drawings, supported by suitable brackets on a base 7 is a hood 8 inclosing three groups of pipes. The pipes of group 9 are connected by manifolds to a main supply pipe 10, those of the next group 11, are similarly connected with a steam supply pipe 12, and those of the third group 13 with a supply pipe 14. On the under sides of all the pipes of these groups are openings 15 such that when water or steam or other fluid is forced through the pipes it will escape in the form of jets or sprays as illustrated in Fig. 2. Canvas curtains or aprons 15<sup>a</sup> separate the parts of the chamber, formed by the hood, occupied by the different groups.

Passing beneath this hood is an endless conveyer comprising a plurality of transverse rolls 16 carried by chains 17 traveling over pairs of sprocket wheels 18 and 19. The sprockets 18 are mounted on a shaft 20 journaled in bearing brackets 21 secured to the base 7, and having at one end a bevel gear 22 meshing with a pinion 23 on a shaft 24 on which are fast and loose pulleys 25.

Sprockets 19 which are idlers are mounted on a shaft 26 journaled in blocks 27 arranged to slide back and forth in take-up brackets 28, threaded pins 29 on the blocks engaging a portion of the base 7. It will be seen that by turning the pins the blocks 27 may be forced outwardly or inwardly thus tightening or loosening the chains of the conveyer.

Directly beneath the conveyer is a drip box 30 for catching the water from the various pipes. Several units of group 11 are located within said drip box and underneath the conveyer, their jets or sprays being directed upward as shown in Fig. 2. The drip box has an outlet port 31 through which the water falls onto an inclined drain 32 from which it can be carried away as desired.

To cause the rolls 16 to be carried by the conveyer chains 17, the central shaft 33 of each roll has pin-like ends 34 which are loosely inserted in the chains (Fig. 4) at such intervals as to bring the rolls in close but not contiguous proximity to one another.

Means are also provided to cause the rolls to rotate on their own axes during a portion of their travel. The ends of the rolls, just inside the pins 34 have the form of flanged wheels 35 and these wheels are arranged to travel on tracks 36 supported by brackets 37. These tracks extend from a point just outside the feeding end of the machine to a point where the chain begins to turn downward over the sprocket and here they are alined with semi-circular roll guides 38. Adjacent the rolls at this point and positioned substantially parallel with their axes is a discharge conveyer 39 driven in any suitable manner.

Each roll comprises the shaft 33 and end wheels 35 before mentioned, a central hub portion 40 and the body portion 41. This latter is in the form of a cylindrical sheet of metal held between the two end flanges and bent into a number of ridges 42 parallel with the axis so that the roll has a roughened or corrugated appearance.

In operation, tomatoes being taken, for example, as the articles to be cleaned and scalded, they are fed to the conveyer at the left of the hood 8 (Figs. 1 and 2). Power being applied to pulley 25 the conveyer chains will be revolved over the sprockets by means of the operating connection comprising shaft 24, pinion 23, gear 22 and shaft 20. At the same time the rolls that are passing the sprays will rotate on their own axes as before described. As the tomato falls on the rolls, owing to the construction of the latter and the usual elliptical shape, more or less flattened at the stem and bud ends, of the tomato, the latter will take a position between two rolls and the movement of the rolls revolves the tomato so that it presents its stem end and its bud end to the sprays at each revolution. As the rolls move along and rotate on their own axes the tomatoes are rolled over and over between the rolls. As they pass under the first group of pipes (group 9) they are subjected to sprays of water therefrom. Passing the canvas curtain 15$^a$ they enter the scalding chamber and receive jets of steam from above and below. After passing the second canvas curtain sprays of cold water from group 13 are discharged upon them. This latter causes cracking of the skin, facilitates peeling and also serves as a final washing of the tomato. Further facilitation of peeling has been effected during all of this operation by the attrition action due to the tomatoes being turned over and over on the roughened rolls. As the rolls begin to pass downward along the end guide 38 the tomatoes are deposited onto the conveyer 39 by which they are carried away or they may fall directly into suitable receptacles.

It will be apparent that this operation is continuous and owing to the length and number of the rolls a large number of tomatoes can be cleaned and scalded in a short time. Furthermore, because of the position taken by the tomatoes on account of the elliptical shape of the latter and the construction of the rolls this treatment is extremely thorough and effective.

Although this description of the operation deals with tomatoes it is to be understood that tomatoes are taken merely as an example, and that the invention is not to be considered as restricted to the treatment of that particular vegetable.

Having thus described my invention what I claim as new and desire to secure by Letters Patent is:—

1. In an apparatus for treating fruits and vegetables, the combination with means for delivering a plurality of jets of cleansing fluid, of an endless conveyer for carrying the fruit or vegetables through the jets, and means whereby the individual fruit or vegetable is caused to have its stem and bud ends alternately presented to the direct action of said jets during its travel.

2. In an apparatus for treating fruits and vegetables, the combination with means for delivering a plurality of jets of cleansing fluid, of an endless conveyer for carrying the fruit or vegetables through said jets, and means whereby the individual fruit or vegetable is revolved during its travel in a manner such that its stem end and bud end is each alternately presented to the direct action of said jets during its revolution.

3. In an apparatus for treating fruits or vegetables, the combination with means for supplying softening media, of a conveyer for carrying the fruit or vegetables through said softening media, and said conveyer being provided with means whereby an attrition action is caused on the skin of the individual fruit or vegetable.

4. In an apparatus for treating fruits and vegetables, the combination with means for delivering a plurality of jets of softening fluid, of an endless conveyer for carrying the fruit and vegetables through the sprays, said conveyer being provided with means for causing the individual fruit or vegetable to revolve as it passes through the jets to present its stem and bud ends alternately to the direct action of said jets, said conveyer being also provided with means serving to cause an attrition on the skin of the fruit or vegetable.

5. In an apparatus for treating fruits and vegetables, the combination with means for delivering a plurality of jets of cleansing fluid, of an endless conveyer, a plurality of substantially parallel horizontal rolls carried by said conveyer, and means whereby said rolls are caused to rotate on their own axes during a portion of their travel, said jets being directed in planes substantially perpendicular to the axis of said rolls.

6. In an apparatus for treating fruits and vegetables, the combination with means for delivering a plurality of jets of cleansing fluid, of an endless conveyer, a plurality of substantially parallel horizontal rolls having a roughened surface carried by said conveyer, and means whereby said rolls are caused to rotate on their own axes during a portion of their travel, said jets being directed in planes substantially perpendicular to the axis of said rolls.

7. In an apparatus for treating fruits and vegetables, the combination with means for delivering a plurality of jets of cleaning and scalding fluid, of an endless conveyer, a plurality of substantially parallel horizontal rolls having a roughened surface carried by said conveyer, and means whereby said rolls are caused to rotate on their own axes during a portion of their travel, said rolls being so spaced apart as to cause the individual fruit or vegetable to be rolled over and over between any two of them, said jets being directed in planes substantially perpendicular to the axis of said rolls.

In witness whereof, I have hereunto subscribed my name in the presence of two witnesses.

JOHN C. McINTYRE.

Witnesses:
 JOHN B. WALLBRIDGE,
 A. M. HONEYWELL.